July 12, 1955
N. F. DETTMERING ET AL
2,712,903
WOOD RECHIPPER FEEDER
Filed Oct. 13, 1952
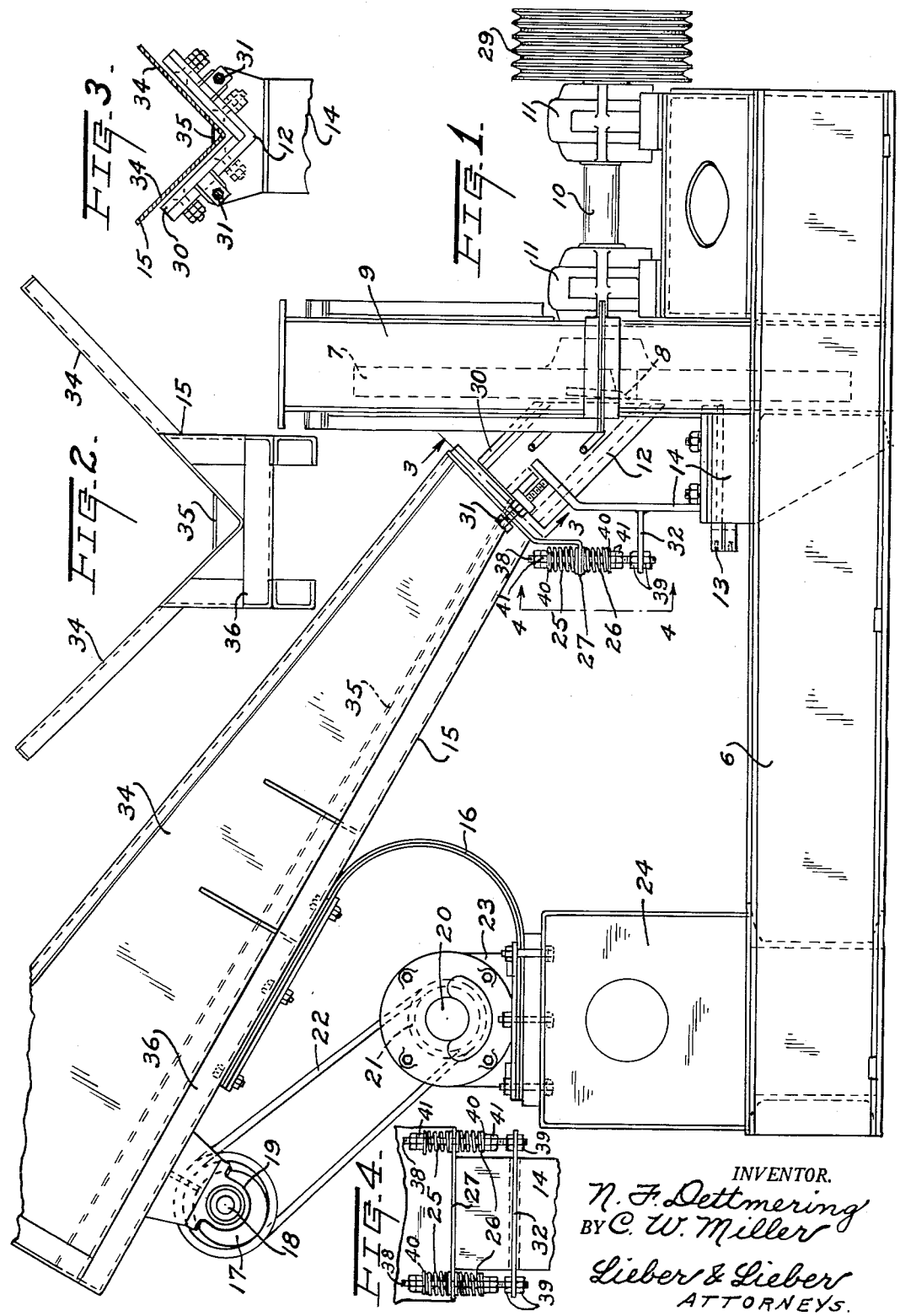
INVENTOR.
N. F. Dettmering
BY C. W. Miller
Lieber & Lieber
ATTORNEYS.

United States Patent Office 2,712,903
Patented July 12, 1955

2,712,903

WOOD RECHIPPER FEEDER

Norman F. Dettmering, Wausau, and Clarence W. Miller, Eland, Wis., assignors to D. J. Murray Manufacturing Co., Wausau, Wis., a corporation of Wisconsin Application October 13, 1952, Serial No. 314,434

5 Claims. (Cl. 241—92)

The present invention relates generally to improvements in the art of paper production, and relates more specifically to improvements in devices for rechipping the rejects from primary or initial wood chippers in paper mills.

The principal object of our invention is to provide an improved re-chipper for the rejects from previous wood chipping operations in paper mills or the like, which is simple in construction and efficient in operation.

It has heretofore been proposed as in Patent No. 2,582,537 granted January 15, 1952, to provide a wood re-chipper with an elongated vibratory downwardly inclined feed trough or hopper having relatively laterally inclined opposite side walls of gradually increasing angularity approaching the outlet end of the trough, and wherein the lower hopper end is slidably rested upon and supported by a stationary inclined V-shaped feed spout leading to the cutting or re-chipping zone. The vibratory feeding motion of the trough-like hopper is produced by mounting the medial portion of the trough upon arcuate leaf springs and by applying rapid rotary motion to an unbalanced flywheel journalled upon the upper end of the hopper, and while this type of vibrating mechanism is capable of functioning in a satisfactory manner, the hopper trough should be freely movable and any sliding or other contact thereof with stationary structure such as the fixed feed spout tends to neutralize the vibratory action and to retard the flow of material toward the re-chipper blades. Then too, the opposite sides of the hopper should preferably be uniformly laterally inclined throughout their lengths and should preferably terminate in a flat bottom instead of a sharp V-angle, in order to further eliminate retardation of the flow of material toward the chipper feed spout and cutting blades, and to maintain a steady and uninterrupted feed to the cutting zone.

It is therefore an important object of the present invention to provide various improvements in the construction and operation of re-chippers of the general type embodying an elongated downwardly inclined vibratory material feeding hopper cooperating with a fixed feed spout communicating with the reduction zone, whereby most effective advancement of the material is insured at all times.

Another important object of this invention is to provide an improved wood re-chipping unit in which the stationary inclined feed spout of the chipper coacts with a freely floating vibratory feed hopper in a manner whereby retardation to the flow of fresh material is eliminated and the vibratory feeding motion is most effectively utilized.

A further important object of our invention is to provide an improved re-chipper assemblage for wood chip rejects, wherein the material is delivered into the re-chipper feed spout from a vibratory inclined feed trough having specially formed side walls and a bottom for avoiding obstruction to the flow of material therealong.

Still another object of the invention is to provide a simple, compact and durable wood re-chipping installation which is power driven to automatically perform its intended function most effectively and with minimum attention.

These and other more specific objects and advantages of the invention will be apparent from the following detailed description from which it will be apparent that the gist of the invention is the provision of a chipping unit for the rejects of previous chipping operation, wherein a re-chipper having blades cooperable with a fixed inclined feed spout or anvil cooperates with an elongated similarly inclined freely floating vibratory trough or hopper having a flat bottom and uniformly laterally inclined opposite side walls, so as to insure most effective utilization of the vibratory motion in advancing the material toward the re-chipping zone with minimum retardation to the flow of said material.

A clear conception of the several features constituting our present invention and of construction and operation of a commercial re-chipping unit embodying the same, may be had by referring to the drawings accompanying and forming a part of this specification wherein like reference characters designate the same or similar parts in the various views.

Fig. 1 is a side elevation of the improved re-chipping unit completely assembled and ready for commercial operation;

Fig. 2 is an end view of the vibratory inclined material feeding trough or hopper, looking downwardly toward its upper end;

Fig. 3 is a transverse section through the assemblage, taken along the line 3—3 of Fig. 1; and Fig. 4 is a view looking toward the floating resilient support for the lower end of the vibrating feed hopper, viewed in the direction of the arrows 4—4 of Fig. 1.

While the invention has been illustrated and described herein as having been embodied in a belt driven re-chipping unit wherein vibratory motion is imparted to the feeding hopper by one or more rapidly revolving eccentric weights carried by the upper hopper end, it is not the intent to unnecessarily restrict the utility of the improved features by virtue of this limited embodiment, and it is also contemplated that specific descriptive terms employed herein be given the broadest possible interpretation consistent with the disclosure.

Referring to the drawing, the commercial rechipping installation illustrated therein, comprises in general a sturdy main frame or base 6; a chipping rotor 7 carrying an annular series of approximately radial knives 8 revolvable in a vertical plane within a housing or casing 9 by means of a shaft 10 journalled in bearings 11, both the casing 9 and the bearings 10 being mounted on one end of the base 6; a stationary inclined anvil or feed spout 12 and an adjustable bed knife 13 carried by a bracket 14 also mounted upon the base 6 adjacent to the rotor housing 9; an elongated downwardly inclined feed trough or hopper 15 having its medial portion mounted upon and being resiliently supported by means of one or more curved leaf springs 16; an unbalanced vibrating rotor 17 for the hopper 15 carried by a transverse shaft 18 journalled in bearings 19 secured to the upper portion of the hopper trough; a power shaft 20 having a sheave 21 drivingly connected by flexible endless V-belts 22 with the rotor 16, the shaft 20 being journalled in bearings 23 which together with the springs 16 are supported by a pedestal 24 carried by the end of the base 6 remote from the chipper; and several sets of resilient elements or helical springs 25, 26 coacting with opposite sides of a flange 27 rigidly associated with the lower end of the hopper 15, and being adjustably secured to the bracket 14 to floatingly support the lower hopper end in spaced relation to the fixed anvil spout 11.

The chipper rotor 7, cutting knives or blades 8, and housing or casing 9 are of relatively standard and well known construction, and the rotor driving shaft 10 may be connected to a suitable power source in any suitable manner as by an endless V-belt drive 29. The stationary feed anvil or spout 12 may be provided with a longitudinally adjustable V-shaped liner 30 adapted to be moved toward or away from the cutting zone of the blades 8 by means of jack screws 31, and the bed knives 13 which cooperate with the revolving blades 8 are also of well known construction. The bracket 14 is preferably provided with a rigid shelf 32 which cooperates with the floating support for the lower end of the hopper 15 in a manner to be subsequently described.

The elongated downwardly inclined vibratory hopper 15 is of improved construction and comprises a pair of laterally inclined opposite side walls 34 which are flat and uniformly inclined throughout their entire lengths, and a flat bottom plate 35 firmly connecting the lower edges of the walls 34. The side walls 34 are of gradually decreasing height in a direction approaching the spout 12, and the bottom 35 is also of gradually diminishing width in the same direction and serves to materially reinforce the side walls and to strengthen the hopper 15. The hopper is also further reinforced by a frame 36 to which the springs 16 and bearings 19 are secured.

It is extremely important to floatingly support the lower end of the feed trough or hopper 15 so that the vibratory feeding motion imparted thereto by the unbalanced revolving weights of the rotor 17 will not be dampened or otherwise interfered with, and the springs 25, 26 which coact with the opposite sides of the flange 27 provide such a resilient floating support. These helical springs 25, 26 surround upright studs 38 the lower ends of which are adjustably secured to the shelf 32 by nuts 39, and the ends of the springs 25, 26 remote from the flange 27 coact with washers 40 which engage adjusting nuts 41 movable along the studs 38 to vary the spring tension; see Figs. 1 and 4. The lower end of the hopper 15 is thus constantly resiliently supported in spaced relation to the upper end of the fixed anvil spout 12 and liner 30 as illustrated in Fig. 3, and never touches these fixed elements.

When the improved unit has been properly constructed and assembled as above described, the chipping rotor 7 may be rotated at high speed by applying power to the sheave 29 so as to cause the knives 8 to rapidly revolve in a vertical plane closely adjacent to the fixed anvil spout 12 and bed knife 13. The feed hopper 15 may be simultaneously vibrated by applying power to the shaft 20 thereby causing the unbalanced rotor 17 to revolve and to impart vibratory motion to the leaf springs 16. The material which is to be re-chipped may then be delivered into the upper end of the hopper 15 and will gradually advance between the inclined side walls 34 and along the flat bottom 35 toward the chipping zone, and will eventually fall off of the lower hopper end into the spout liner 30 from which it will be delivered by gravity into the path of the revolving knives 8.

The unit thus functions to effectively re-chip the oversize material obtained from previous chipping operations, and the formation of the hopper 15 with uniformly inclined opposite side walls 34 and a flat bottom 35 permits elongated pieces and slivers to properly adjust themselves as they advance along the hopper under the influence of the vibratory feed motion. Clogging of the hopper 15 is thus positively eliminated, and the free floating motion at the lower end of this hopper also definitely avoids retardation and dampening of the vibratory feeding motion and insures rapid progress of the material along the feed trough. The liner 30 of the fixed anvil spout 12 may be adjusted to insure proper cooperation with the knives 8, with the aid of the jack screws 31; and the position of the lower hopper end relative to this liner 30 may be varied by adjusting the nuts 39 coacting with the studs 38, while the tension of the springs 25, 26 may be altered by manipulating the nuts 41 which engage the washers 40.

From the foregoing detailed description it will be apparent that the present invention in fact provides an improved re-chipper for rejects from primary wood chipping operations, which is simple in construction and highly efficient in operation due to the improved mounting and formation of the feed trough or hopper 15. The freely floating hopper permits the vibratory motion to be most effectively utilized for feeding purposes, while the uniformly inclined opposite side walls 34 cooperate with the flat bottom 35 to insure free flow of irregular pieces of diverse sizes and shapes along the feed trough. The various parts of the unit are also readily adjustable so as to insure most effective functioning, and the improved assemblage has proven highly satisfactory and effective in actual commercial use.

It should be understood that it is not desired to limit this invention to the exact details of construction and operation of the re-chipper herein shown and described, for various modifications within the scope of the appended claims may occur to persons skilled in the art.

We claim:

1. A re-chipper for rejects from wood chipping operations, comprising, a chipper having revolving blades cooperable with a rigidly mounted inclined trough-like feed spout for delivering the material to be rechipped to the blades, an elongated vibratory feed hopper inclined downwardly toward the upper end of said spout transversely of the path of revolution of said blades, means at the lower end of said spout for freely floatingly supporting said hopper end closely adjacent to but constantly spaced from said upper spout end, and resilient means coacting with upper portions of said hopper for effecting vibratory motion thereof.

2. A re-chipper as per claim 1, wherein the means for floatingly supporting the lower end of the hopper comprises a flange carried by the hopper and opposed resilient elements between which said flanges are interposed to provide a flexible support.

3. A re-chipper as per claim 2, wherein the resilient elements are helical springs provided with means for varying the pressures exerted by the springs against the intervening flange.

4. A re-chipper as per claim 1, wherein the elongated hopper has opposite walls of diminishing height proceeding toward the lower hopper end, and in which said walls are plane and have uniform relative inclination throughout the entire length of the hopper.

5. A re-chipper as per claim 4, wherein the elongated hopper has a plane bottom of gradually decreasing width proceeding toward the lower hopper end.

References Cited in the file of this patent

UNITED STATES PATENTS

| Number | Name | Date |
| --- | --- | --- |
| Re. 23,650 | Flateboe | May 5, 1953 |
| 529,219 | Thompson | Nov. 13, 1894 |
| 666,211 | Shortt | Jan. 15, 1901 |
| 943,965 | Boutell | Dec. 21, 1909 |
| 1,029,998 | Joplin | June 18, 1912 |
| 1,129,866 | Hamel | Mar. 2, 1915 |
| 1,515,377 | White | Nov. 11, 1924 |
| 2,417,878 | Luzietti | Mar. 25, 1947 |
| 2,582,537 | Flateboe | Jan. 15, 1952 |